US010652021B2

(12) United States Patent
Barry

(10) Patent No.: US 10,652,021 B2
(45) Date of Patent: May 12, 2020

(54) SECURITY IMPROVEMENTS IN A CELLULAR NETWORK

(71) Applicant: VODAFONE IP LICENSING LIMITED, Newbury, Berkshire (GB)

(72) Inventor: Aguibou Mountaga Barry, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 60 days.

(21) Appl. No.: 15/565,493

(22) PCT Filed: Apr. 13, 2016

(86) PCT No.: PCT/GB2016/051030
§ 371 (c)(1),
(2) Date: Oct. 10, 2017

(87) PCT Pub. No.: WO2016/166529
PCT Pub. Date: Oct. 20, 2016

(65) Prior Publication Data
US 2018/0083782 A1    Mar. 22, 2018

(30) Foreign Application Priority Data
Apr. 13, 2015 (GB) .................................. 1506256.5

(51) Int. Cl.
*H04L 9/32* (2006.01)
*H04W 12/06* (2009.01)
(Continued)

(52) U.S. Cl.
CPC .......... *H04L 9/3226* (2013.01); *H04L 9/0618* (2013.01); *H04L 9/0838* (2013.01);
(Continued)

(58) Field of Classification Search
CPC ... H04L 9/3226; H04L 9/0618; H04L 9/0838; H04L 9/0861; H04L 63/0428;
(Continued)

(56) References Cited

U.S. PATENT DOCUMENTS 8,634,560 B1 * 1/2014 Ng ........................ H04L 9/0822
380/273
2010/0062791 A1 * 3/2010 Wang ..................... H04W 12/12
455/456.1
(Continued)

FOREIGN PATENT DOCUMENTS

EP    2203008 A1    6/2010
EP    2293610 A1    3/2011
(Continued)

OTHER PUBLICATIONS

International Search Report and Written Opinion issued in PCT/GB2016/051030 dated Jul. 15, 2016.
(Continued)

*Primary Examiner* — David Le
(74) *Attorney, Agent, or Firm* — Workman Nydegger

(57) ABSTRACT

The present disclosure relates to secure communication over a cellular network between a mobile terminal 30 and a network entity 40 via a node of a cellular network, wherein a Home Public Land Mobile Network, PLMN, of the mobile terminal generates a ciphering key, CK, and/or an integrity key, IK, for authentication of the mobile terminal and wherein performance of an Authentication and Key Agreement, AKA, procedure between the mobile terminal and the node of the cellular network permits the mobile terminal to determine CK and/or IK. In particular, there is provided the method comprising applying a special key to allow communication of user-plane data between the mobile terminal and the network entity in a trusted manner, wherein the
(Continued)

special key is generated from the CK and/or IK but is different from the CK and IK.

17 Claims, 5 Drawing Sheets

(51) Int. Cl.
| | | |
|---|---|---|
| *H04W 12/04* | (2009.01) | |
| *H04L 9/06* | (2006.01) | |
| *H04L 9/08* | (2006.01) | |
| *H04L 29/06* | (2006.01) | |
| *H04W 4/70* | (2018.01) | |

(52) U.S. Cl.
CPC ........ *H04L 9/0861* (2013.01); *H04L 63/0428* (2013.01); *H04W 12/04* (2013.01); *H04W 12/06* (2013.01); *H04L 2209/80* (2013.01); *H04W 4/70* (2018.02)

(58) Field of Classification Search
CPC .. H04L 2209/80; H04W 12/04; H04W 12/06; H04W 4/70
See application file for complete search history.

(56) References Cited

U.S. PATENT DOCUMENTS

| | | | |
|---|---|---|---|
| 2011/0305339 A1 | 12/2011 | Norrman et al. | |
| 2014/0003604 A1* | 1/2014 | Campagna | H04L 9/08 380/247 |
| 2015/0382189 A1* | 12/2015 | Zhang | H04W 12/04 380/285 |

FOREIGN PATENT DOCUMENTS

| | | |
|---|---|---|
| GB | 2509937 A | 7/2014 |
| WO | 2007108651 A1 | 9/2007 |
| WO | 2008046915 A1 | 4/2008 |

OTHER PUBLICATIONS

3GPP:Technical Specification Group Services and System Aspects; 3GPP System Architecture Evolution (SAE); Secuirty Architecture (Release 9); TS 33.401, No. V9.3.1, Apr. 14, 2010.
European Search Report issued in Application No. GB1506256.5 dated Sep. 13, 2015.
Forsberg et al. "LTE Security" John Wiley and Sons Ltd., Jan. 1, 2013.

* cited by examiner

SECURITY IMPROVEMENTS IN A CELLULAR NETWORK

TECHNICAL FIELD OF THE INVENTION

The invention concerns a method for secure communication over a cellular network between a mobile terminal and a network entity (such as a GGSN). A corresponding network node and/or mobile terminal are also provided.

BACKGROUND TO THE INVENTION

Cellular networks are increasingly used by Machine-to-Machine (M2M) devices, for example as part of the so-called "Internet of Things" (IoT). Many such devices are battery operated and are therefore subject to significant power limitations, for example needing to last with a 5 kWh battery for about ten years. In some applications, communications security for such M2M or IoT devices, in particular so that user-plane data is communicated in a trusted manner, is a significant concern. This security can be in the form of confidentiality protection and/or data integrity protection. For some M2M or IoT users, interception or imitation (so-called "spoofing") of user data could endanger their business, their reputation or their own safety.

When cellular M2M or IoT operate in a Home Public Land Mobile Network (PLMN), the network operator can guarantee a particular security level within their PLMN domain. In many cases though, these devices will not operate in their Home PLMN. The Home PLMN cannot ensure user data security, when the device operates in a visited PLMN. When security is an issue, users with devices operating in a visited PLMN may therefore rely on additional application layer or transport layer security mechanisms, such as Transport Layer Security (TLS) or Generic Bootstrapping Architecture (GBA).

A recent study for the Third Generation Partnership Project (3GPP) Technical Specification Group (TSG) SA (Service and System Aspects) WG3 (S3-151121) compared the UMTS Authentication and Key Agreement (AKA) procedure with TLS and GBA. This study found that TLS and GBA are significantly less efficient than the AKA procedure, especially if the cellular network only provides a very low throughput connection (such as 160 bits per second) to the M2M or IoT device. When power consumption is considered, the significant number of communication exchanges and length of time needed to perform TLS or GBA could make them unsuitable for low power, low throughput devices. In particular, TLS has a large number of different security configurations, making it difficult to optimise.

These procedures therefore consume a non-negligible quantity of resources (in terms of time and/or energy). The configuration selected by M2M or IoT service providers to protect the user-plane data could considerably affect the performance of the cellular IoT network and the devices could run out of battery earlier than expected. AKA, which is required for GPRS/UMTS or Evolved Packet System (EPS), appears much more efficient by comparison. Finding a procedure that can co-operate with AKA, but which does not add significant disadvantages associated with other existing security protocols, is therefore a challenge.

SUMMARY OF THE INVENTION

Against this background, the invention provides a method for secure communication over a cellular network between a mobile terminal and a network entity via a node of a cellular network in accordance with claim 1. A computer program in line with claim 17 may also be considered, although the invention may also be embodied in the form of programmable logic, firmware or other configurable system. A corresponding network node as defined by claim 18 and a mobile terminal as specified by claim 19 are also provided. Other preferred features are disclosed with reference to the claims and in the description below.

The present invention concerns where the Home PLMN of the mobile terminal generates a ciphering key (CK) and/or an integrity key (IK) for authentication of the mobile terminal. Typically, both CK and IK are generated. The mobile terminal may comprise a User Equipment (UE) and/or a USIM application, which may be stored on hardware separate from the UE, such as a Universal Integrated Circuit Card (UICC). Performance of an AKA procedure between the mobile terminal and the node of the cellular network permits the mobile terminal to determine CK and/or IK. Normally, this is due a shared secret (K), common to the mobile terminal and a home registration entity in the Home PLMN. A special key is applied to allow communication of user-plane data between the mobile terminal and the network entity in a trusted manner. The special key is generated from the CK and/or IK but is different from the CK and IK. The method optionally further comprises generating the special key from the CK and/or IK. Some network entities may use the special key, although they may receive it from another network entity and not generate it themselves.

Hence, CK and/or IK are used to generate one or more new keys. The new key or keys are used to secure the user-plane data communication between the mobile terminal and the network entity. The security provided may be applied through part of the link from the mobile terminal to the network entity (end-to-end security) or part of the link (Inter-PLMN security), as will be discussed below. The network entity is typically in the Home PLMN or coupled to a network entity that is in the Home PLMN. For example, the network entity may be the GGSN or coupled to the GGSN. It is not normally part of a visited PLMN. The special key can also be generated from a random number seed, the random number seed preferably being generated for the special key only.

Multiple special keys may be applied. For example, a first special key may be applied to allow confidentiality protection (encryption or decryption) and/or validation of the user-plane data (in the way that CK is normally used in UMTS or EPS). Then, a second special key may be applied to allow integrity protection and/or validation of the user-plane data (in the way that IK is normally used in UMTS or EPS). The second special key is generated from the CK and/or IK but is different from the CK and the IK. Preferably, the second special key is different from the first special key, but optionally they may be the same.

The keys used for AKA may therefore be changed from the CK and the IK to improve security. For example, one or more alternate keys may be generated from the CK and/or IK. In particular, this may be done in such a way that the CK and IK cannot be derived from the one or more alternate keys. Preferably, the one or more alternate keys are different from the special key. The one or more alternate keys (CK' and/or IK') are then preferably used as part of an AKA procedure between the mobile terminal and the cellular network. An authentication vector which includes the one or more alternate keys may be communicated from a home registration entity in the Home PLMN (such as a HSS/HLR) to a visitor registration entity in a Visited PLMN (such as an SGSN) being used by the mobile terminal. This may allow AKA to be effected without complication or loss of security. In some embodiments, the method further comprises receiving an AKA authentication result message at the home registration entity from a visitor registration entity in a Visited PLMN being used by the mobile terminal.

The mobile terminal may be alerted to the change in procedure from normal. For example, an authentication management field flag may be communicated from the cellular network to the mobile terminal, indicating the use of the special key and/or the use of one or more alternate keys. In the preferred embodiment, the mobile terminal generates the special key. Then, applying the special key may comprise security protecting and/or validating (for confidentiality or integrity) the user-plane data at the mobile terminal using the special key. This may allow end-to-end security.

In the preferred embodiment, the special key is generated at a home registration entity in the Home PLMN (such as a HSS/HLR/AuC). Then, one way to apply the special key is communicating it from the home registration entity to the network entity. This communication may be in response to different triggers. In one embodiment, it is in response to the step of generating the special key. This may be termed a 'push' approach. In an alternative 'push' approach, it can be performed in response to receiving the AKA authentication result message. The AKA authentication result message optionally identifies a routing address for the network entity and the special key may then be communicated using the identified routing address.

In another embodiment, a pull message is communicated from the network entity to the home registration entity. The pull message preferably provides indication data for identifying the mobile terminal. Then, the special key is advantageously communicated from the home registration entity to the network entity in response to receiving the pull message. The indication data is advantageously communicated from a visitor registration entity in a Visited PLMN to the network entity, prior to communicating the pull message. The indication data is beneficially used to allow the home registration entity to confirm that the network entity has the correct data. For example, the indication data for identifying the mobile terminal may comprise one or more of: a key identifier associated with the mobile terminal; an authentication data item, derived from an authentication vector for the mobile terminal communicated from the home registration entity to a visitor registration entity in a Visited PLMN being used by the mobile terminal; an International Mobile Subscriber Identity (IMSI) for the mobile terminal; and a Mobile Subscriber ISDN (MSISDN) for the mobile terminal.

In some embodiments, inter-PLMN security may be provided. Then, the special key is generated at a home registration entity in the Home PLMN. The special key is communicated from the home registration entity to a visitor registration entity in a Visited PLMN being used by the mobile terminal. Advantageously, the special key is used at the visitor registration entity to communicate the user-plane data in a trusted manner, for example by confidentiality and/or integrity protecting the user-plane data. Additionally, or alternatively, the special key is used to provide subscribed identity privacy protection, for example by confidentiality protecting the GTP header in communications.

Any or all of the above features and/or methods and/or aspects can be combined in any suitable or compatible manner in order to arrive at additional aspects of the invention without departing from the described invention.

DRAWINGS

Aspects of the present disclosure are described by way of example only with reference to the following drawings, in which.

DETAILED DESCRIPTION

Figure 1:
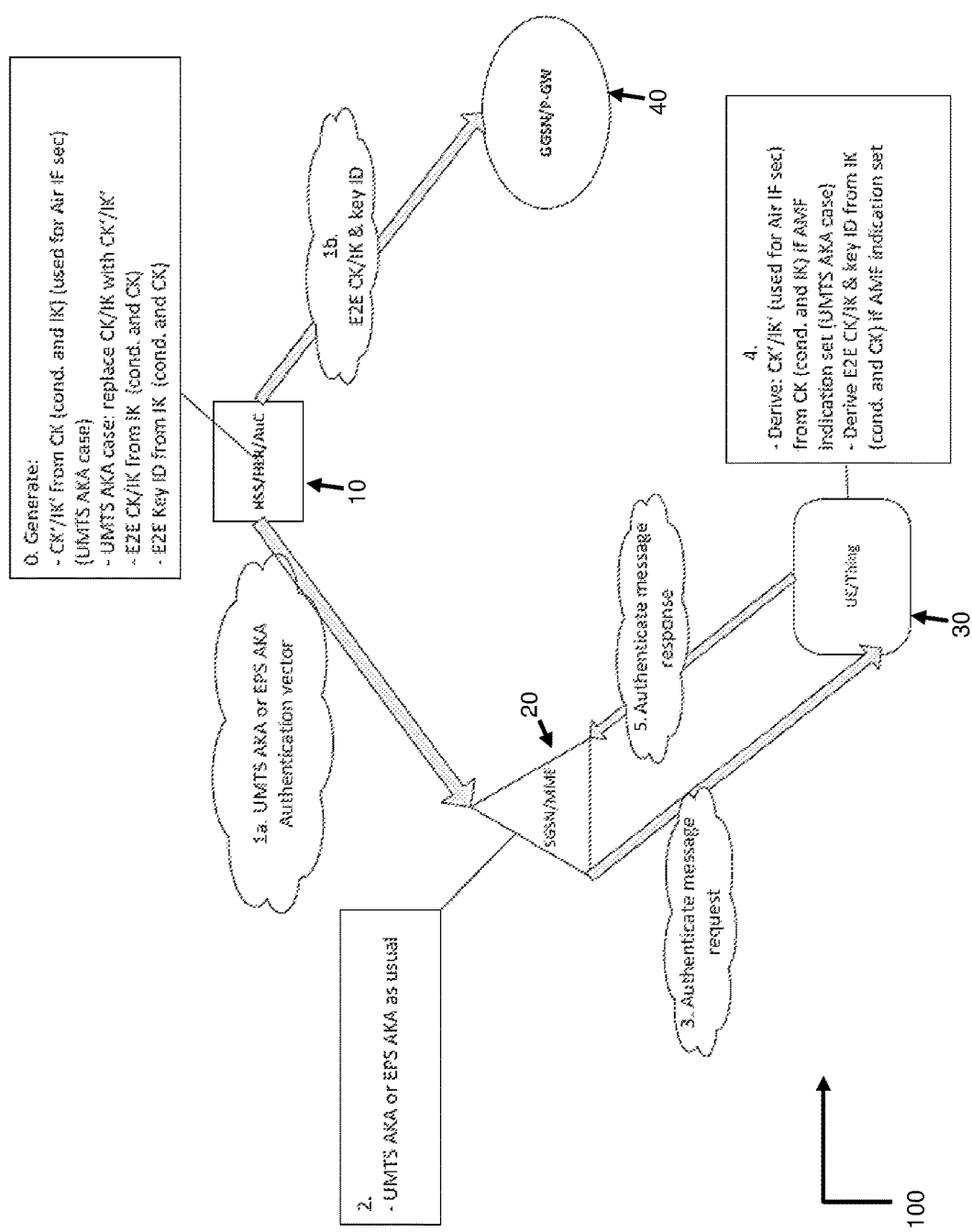
FIG. 1 shows a highly schematic representation of a system using which E2E keys are established at a mobile terminal and a network entity in accordance with a first embodiment.

The following defines enhanced authentication and key agreement procedures for mobile network with a Cellular Internet-of-Things RAT which extends the UMTS AKA (See 3GPP TS 33.102, clause 6.3) and EPS AKA (3GPP TS 33.401, clause 6.1) procedures:

While remaining compatible with existing security procedures between the UE and the E-UTRAN defined in 3GPP TS 33.401

While remaining compatible with existing security procedures between the UE and the GERAN when UMTS AKA is used as defined in 3GPP TS 33.102

To derive additional keys (from CK and either a randomly generated number or a counter) securing data transmitted between fixed inter-network elements i.e. the SGSN-GGSN interface and SGW-PGW interface To derive additional keys (from IK, and from CK under specific circumstance) securing data in an end-to-end fashion between the UE and a network node within the Home PLMN.

Two types of security protection are described:

1. UE-to-home network E2E protection:

"End-to-End" protection of the user plane data is being provided from the UE to the home network. "UE to GGSN" protection of the user plane data is being provided from the UE to the home network. GGSN/P-GW is mentioned below as a concrete endpoint for terminating the "end-to-end" security, but the security functionalities to be supported at this end can also be generalized as a logical node which may be collocated with the GGSN/P-GW or directly supported by the GGSN/P-GW.

The term "end-to-end" security used above refers to security protection being applied to a communication happening between two endpoints and wherein the communication may traverse intermediaries which are not able to perform security operations on the data being exchanged between those two endpoints.

The UE (resp. GGSN/P-GW) uses the relevant key to generate/verify a signature/MAC or cipher/decipher the user plane data.

For different key agreement procedures are under consideration in this study:
 E2E security solution with HLR push procedure
 E2E security solution with HLR push procedure—Alternative
 E2E security solution with GGSN pull procedure
 E2E security solution with GGSN pull procedure—Alternative
 2. Inter-PLMN interface protection:
 This type of protection can be used when the H-PLMN has a higher level of trust toward the visited network as the endpoint entity. As such, the visited network provides user plane (UP) data origin authenticity and/or confidentiality on behalf of the UE. The communication link which carries the GTP packets between the H-PLMN and the visited network isn't trusted.

The user plane data (lowest level being the N-PDU packets) is intended to be protected by the generated keys, but those keys could also be used to protect lower layer messages such as the GTP header hence providing subscriber identity privacy protection The HLR provides the key material to SGSN/MME (those keys are ultimately provided to the S-GW by the SGSN/MME for the LTE case and for the S4-SGSN case) and GGSN/P-GW to ensure confidentiality and/or integrity of the user plane content.

One key agreement procedure is under consideration in this study:
 Inter-PLMN security solution with HLR push Procedure
 All those procedures share one possible way of implementing the key derivation rules. Other possible implementations options may also be defined.

A solution for authentication and key usage policy on UMTS AKA and EPS AKA is also provided, given the fact that an authentication policy not properly defined at the visited network side may harm the battery of the roaming UE.

FIG. 1 is a highly schematic representation of a system 100 comprising a Home Subscriber Server (HSS) 10, a Serving GPRS Support Node (SGSN) 20, a User Equipment (UE) 30 and a Gateway GPRS Support Node (GGSN) 40. Steps 0. to 5. of a process in accordance with a first embodiment of the present disclosure are also represented in FIG. 1.

It will be appreciated that the HSS 10 may alternatively be a Home Location Register (HLR), or an Authentication Centre (AuC), or any other suitable home registration entity, but will be described only as an HSS in the following description for the sake of efficiency. Likewise, the SGSN 20 may alternatively be a Mobility Management Entity (MME), a Visitor Location Register (VLR), or any other cellular network node and/or visit registration entity configured to perform the functionality described below, but will be described only as an SGSN in the following description for the sake of efficiency. Likewise, the UE 30 may be any form of mobile terminal, for example a Machine-to-Machine (M2M) device, or a 'Thing' in the Internet of Things (IoT), or a UICC or Smart Card, but will be described only as a UE in the following description for the sake of efficiency. Likewise, the GGSN 40 may alternatively be PDN Gateway (P-GW) or any other network entity or server configured to perform the functionality described below, but will be described only as a GGSN in the following description for the sake of efficiency.

The HSS 10 and the GGSN 40 are part of a Home Public Land Mobile Network (H-PLMN) of the UE 30, whereas the SGSN 20 is part of a Visited Public Land Mobile Network (V-PLMN).

The entities and communications within the system 100 may utilise any suitable communications standards and/or protocols, for example GPRS, EDGE, 3G, LTE, etc.

When the UE 30 joins the V-PLMN, an Authentication and Key Agreement (AKA) procedure may be run, for example UMTS AKA (described in 3GPP TS 33.102) or EPS AKA (3GPP TS 33.401). As defined in the standards, as part of the AKA procedure, an Authentication Vector is used and a ciphering/confidentiality key (CK) and an integrity key (IK) are determined (for example, from a shared secret, K, common to the HSS 10 and the UE 30).

In Step 0., before the Authentication Vector is communicated to the SGSN 20, the HSS 10 derives a first special key (E2E CK) to allow confidentiality protection and/or validation of user plane data communicated between the UE 30 and the GGSN 40 (described in more detail later). E2E CK is derived to be different from CK and IK. E2E CK may be derived from IK, or from CK and IK (for example, from a concatenation of CK and IK). E2E CK may be derived in any suitable way, for example using HMAC SHA 256, or any other suitable algorithm/function. Optionally, the HSS 10 also generates a key ID for E2E CK.

Also in step 0., the HSS 10 derives a second special key (E2E IK) to allow integrity protection and/or validation of user plane data communicated between the UE 30 and the GGSN 40 (described in more detail later). E2E IK is derived to be different from CK and IK. E2E IK may be derived from IK, or from CK and IK (for example, from a concatenation of CK and IK). E2E IK may be derived in any suitable way, for example using HMAC SHA 256, or any other suitable algorithm/function. Optionally, the HSS 10 also generates a key ID for E2E IK.

The key derivation function (KDF) used for E2E CK and E2E IK (and for E2E CK Key ID and E2E IK Key ID) should be one that is supported by the UE 30 (for example by a Universal Integrated Circuit Card, UICC, or a Smart Card).

In one example key generation procedure, if CK and IK are each 128 bits long, E2E CK and E2E CK Key ID may be derived by:

$$E2E\ CK = KDF(CK\|IK, key\ type)$$

$$E2E\ CK\ Key\ ID = KDF(CK\|IK, key\ type)$$

and E2E IK and E2E IK Key ID may be derived by:

$$E2E\ IK = KDF(CK\|IK, key\ type)$$

$$E2E\ IK\ Key\ ID = KDF(CK\|IK, key\ type)$$

In a further example key generation procedure, if CK and IK are each 256 bits long, E2E CK and E2E CK Key ID may be derived by:

$$E2E\ CK = KDF(IK, key\ type)$$

$$E2E\ CK\ Key\ ID = KDF(IK, key\ type)$$

and E2E IK and E2E IK Key ID may be derived by:

$$E2E\ IK = KDF(IK, key\ type)$$

$$E2E\ IK\ Key\ ID = KDF(IK, key\ type)$$

In these examples, the key derivation function is written as KDF (Key, S). 'key type', or S, may be a constant/static value, for example 3GPP-E2E-CK-SEC, 3GPP-E2E-IK- SEC, CKGERAN, IKGERAN, CKinterGSN128, IKinterGSN128, CKinterGSN256, IKinterGSN256, E2E_CK_128, E2E_IK_128, E2E_CK_256, E2E_IK_256, E2E_Key_ID, etc, etc. The algorithm used for the key derivation function may be HMAC SHA 256 (as defined in 3GPP TS 33.220), although it will be appreciated that other algorithms may alternatively be used. E2E CK and E2E IK may be derived in such a way that it is very difficult, or impossible, to determine CK and/or IK from either E2E CK or E2E IK (or from E2E CK Key ID or E2E IK Key ID).

The above procedures for generating E2E CK, E2E IK, E2E CK Key ID and E2E IK Key ID are described by way of example only. Other suitable key generation procedures supported by the UE 30 may alternatively be used.

The HSS 10 sets the Authentication Vector to indicate to the UE 30 that key derivation is required in order to obtain E2E CK and E2E IK. This may be done, for example, by setting to 1 an Authentication Management Field (AMF) bit that is reserved to indicate the use of E2E keys.

For UMTS AKA, in step 0. the HSS 10 may also derive a first alternate key (CK') for use in the AKA procedure for the Air Interface between the SGSN 20 and the UE 30. CK' is derived to be different from CK and IK. CK' may be derived from CK, or from CK and IK (for example, from a concatenation of CK and IK). CK' may be derived in any suitable way, for example using HMAC SHA 256, or any other suitable algorithm/function. Furthermore, the HSS 10 also derives a second alternate key (IK') for use in of the AKA procedure for the Air Interface between the SGSN 20 and the UE 30. IK' is derived to be different from CK and different from IK. IK' may be derived from CK, or from CK and IK (for example, from a concatenation of CK and IK). IK' may be derived in any suitable way, for example using HMAC SHA 256, or any other suitable algorithm/function. CK' and IK' may be derived in an irreversible manner, such that CK and IK cannot be determined from CK' and IK'. The HSS 10 then replaces CK and IK in the Authentication Vector with CK' and IK'. In this way, CK and IK are not communicated to SGSN 20 as part of the UMTS AKA procedure—instead CK' and IK' are communicated to the SGSN 20 as part of the UMTS AKA procedure. Furthermore, where CK' and IK' are derived in an irreversible manner, it would be very difficult for the SGSN 20, or any other entity, to determine CK and IK from CK' and IK'. In this instance, the reserved AMF bit will also notify the UE 30 that key derivation is required in order to obtain CK' and IK' for use in the UMTS AKA procedure.

The KDF used for CK' and IK' should be one that is supported by the UE 30 (for example by a UICC or a Smart Card).

In one example key generation procedure, if CK and IK are each 128 bits long and Milenage or Tuak is used, CK' and IK' may be derived by:

CK'=KDF(CK∥IK,key type)

IK'=KDF(CK∥IK,key type)

In another example, if CK and IK are each 256 bits long and Tuak is used, CK' and IK' may be derived by:

CK'=KDF(CK,key type)

IK'=KDF(CK,key type)

CK' and IK' may be concatenated (CK'∥IK') for insertion into the Authentication vector, such that CK' goes from bit 0 to bit 127 and IK' goes from bit 128 to bit 255 (or, alternatively, IK' goes from bit 0 to bit 127 and CK' goes from bit 128 to bit 255).

In these examples, the key derivation function is written as KDF (Key, S). 'key type', or S, may be a constant/static value, as explained above. The algorithm used for the key derivation function may be HMAC SHA 256 (as defined in 3GPP TS 33.220), although it will be appreciated that other algorithm may alternatively be used.

The above procedures for generating CK' and IK' are described by way of example only. Other suitable key generation procedures supported by the UE 30 may alternatively be used.

Having built the Authentication Vector to have the reserved AMF bit set as described above, and also to change CK and IK to CK' and IK' in the case of UMTS AKA, in step 1.*a*, the HSS 10 communicates the Authentication Vector to the SGSN 20.

In step 1.*b*, the HSS 10 pushes E2E CK and E2E IK (and optionally also their corresponding Key IDs) to the GGSN 40. The HSS 10 may already have the address for the GGSN 40 for any reasons, for example as a result of earlier communications with the GGSN 40 and/or by identifying with which GGSN the UE 30 will want to communicate (for example, from the APN present in the subscriber information data stored in the HSS 10) etc. E2E CK and E2E IK may be concatenated (E2E CK∥E2E IK) for communication to the GGSN 40, such that E2E CK goes from bit 0 to bit 127 and E2E IK goes from bit 128 to bit 255 (or, alternatively, E2E IK goes from bit 0 to bit 127 and E2E CK goes from bit 128 to bit 255). Likewise, the E2E CK Key ID and E2E IK Key ID may be concatenated (E2E CK Key ID∥E2E IK Key ID) for communication to the GGSN 40, such that E2E CK Key ID goes from bit 0 to bit 127 and E2E IK Key ID goes from bit 128 to bit 255 (or, alternatively, E2E IK Key ID goes from bit 0 to bit 127 and E2E CK Key ID goes from bit 128 to bit 255).

In step 2., the SGSN 20 carries out the AKA procedure (for example, UMTS AKA, or EPS AKA) as defined in the AKA standards.

In step 3., the SGSN 20 communicates an authenticate request to the UE 30 as defined in the AKA standards.

In step 4., the UE 30 performs AKA processes as defined in the AKA standards. The UE 30 also recognises from the reserved AMF bit in the Authentication Vector that in addition to performing the usual AKA procedures, it must also derive E2E CK and E2E IK (and optionally also E2E CK Key ID and E2E IK Key ID) for use in securing E2E communications with the GGSN 40. The UE 30 may derive E2E CK and E2E IK (and optionally also E2E CK Key ID and E2E IK Key ID) from IK, or CK and IK (a USIM application stored on the Universal Integrated Circuit Card, UICC, or Smart Card of the UE 30 may have generated CK and IK as part of the standard AKA procedure) in the same way as described earlier in respect of the HSS 10. Where Key IDs are generated, by generating them in such a way that the UE 30 can itself derive the Key IDs, it is possible for the UE 30 to obtain the Key IDs without them being sent from the HSS 10 to the UE 30 via the SGSN 20. Therefore, the volume of data transfer from the HSS 10 to the SGSN 20, and then from the SGSN 20 to the UE 30, may be minimised. The Key IDs may later be used by the UE 30 and the GGSN 40 in order to track the use of the E2E Keys during subsequent communications, which is not described further in this disclosure.

Furthermore, where UMTS AKA is being used, the UE 30 will also recognise from the reserved AMF bit in the Authentication Vector that in addition to performing the usual AKA procedures, it must also derive CK' and IK' for use in the AKA procedure. The UE 30 may derive CK' and IK' from CK, or CK and IK, in the same way as described earlier in respect of the HSS 10.

The UE 30 may be configured (for example, at time of device manufacture, or at time of UICC manufacture, or subsequently, for example during a device and/or UICC update etc) to comprise the necessary E2E CK and E2E IK (and optionally also E2E CK Key ID and E2E IK Key ID and/or CK' and IK') derivation functions such that it may derive the correct E2E CK and E2E IK (and optionally also the correct E2E CK Key ID and E2E IK Key ID and/or CK' and IK').

Having completed step 4., both the SGSN 20 and the UE 30 have all of the data required to complete the AKA procedure. For example, where UMTS AKA is being used, the SGSN 20 and the UE 30 will both have CK' and IK', using which the UTMS-AKA procedure may be completed.

Furthermore, both the GGSN 40 and the UE 30 will have E2E CK and E2E IK (and optionally also E2E CK Key ID and E2E IK Key ID). Thus, the E2E keys may be used for communicating user plane data between the UE 30 and the SGSN 40 in a trusted manner.

For example, E2E CK may be used to achieve confidentiality protection and/or validation (for example, by encryption/decryption of user-plane data), and E2E IK may be used to achieve integrity protection and/or validation (for example, through generation/verification of a signature and/or MAC).

Because neither E2E CK nor E2E IK will be known to the V-PLMN, the user-plane data may be communicated in a trusted manner, even though the UE 30 communicates with the GGSN 40 via a node (the SGSN 20) of the V-PLMN. Furthermore, because the V-PLMN also does not know CK and IK (because in the UMTS AKA example, rather than using CK and IK, CK' and IK' are used for securing the Air-Interface, and because in EPS AKA, CK and IK are not communicated to the SGSN 20), it would be extremely difficult for the V-PLMN, ever to derive E2E CK and E2E IK. In particular, it would be necessary for the SGSN 20 first to derive or obtain the correct CK and/or IK (which would be very difficult from CK' and IK', since the HSS 10 may derive these from CK and/or IK in an irreversible manner), and then further correctly derive the E2E CK and E2E IK from CK and/or IK.

The example embodiment described above with reference to FIG. 1 may alternatively be described as follows:

Procedure

Pre-Conditions:

The SGSN/MME has indicated the supported security configuration of the GERAN/E-UTRAN to the H-PLMN i.e. the used confidentiality algorithm and integrity protection algorithm (e.g. for GERAN: GEA4 in use, e.g. for LTE 128-EEA2 and 128-EIA2 in use)

Steps:

0. In addition to the generated authentication vectors as defined in UMTS AKA (resp. EPS AKA), the AuC:
   derives CK'/IK' from CK (and under specific condition from a concatenation of CK and IK, see clause Y.1.2.A) (used for Air IF sec) (UMTS AKA case) and set AMF bit to 1 to indicate to the USIM that KDF is required to be done on CK to obtain the usable CK/IK.
   derives E2E CK/IK from IK (and under specific condition from a concatenation of CK and IK, see clause Y1.2.A)
   derive E2E CK/IK key ID from IK (and under specific condition from a concatenation of CK and IK, see clause Y1.2.A)
   sets an AMF bit to 1 to indicate to the SGSN/MME/UE whether E2E keys should be derived
   Build the AV. For the UMTS AKA case, CK/IK is replaced with the newly generated CK'/IK'.
1a. Distribution of AV to the SGSN/MME
1b. The HSS/HLR/AuC pushes to the GGSN/P-GW the following:
   E2E CK/IK
   E2E CK/IK key ID
2. UMTS AKA or EPS AKA is carried on at the SGSN/MME level as defined in TS 33.102 (resp. TS 33.401).
3. SGSN sends the authenticate request message to the UE as defined in TS 33.102 (resp. TS 33.401).
4. USIM runs UMTS/EPS AKA and performs the following additional key derivations:
   CK'/IK'(used for Air IF sec) from CK (and under specific condition from a concatenation of CK and IK, see clause Y1.2.A) (UMTS AKA case ONLY) if the AMF bit which indicate that KDF must be done is set to value 1
   E2E CK/IK from the IK (and under specific condition from a concatenation of CK and IK, see clause Y1.2.A) value if the AMF bit which indicates that E2E KDF must be done is set to value 1
   E2E CK/IK key ID from the IK (and under specific condition from a concatenation of CK and IK, see clause Y1.2.A) value if the AMF bit which indicates that E2E KDF must be done is set to value 1
5. The UE sends the authenticate response message to the SGSN/MME as defined in TS 33.102 (resp. TS 33.401).

Figure 2:
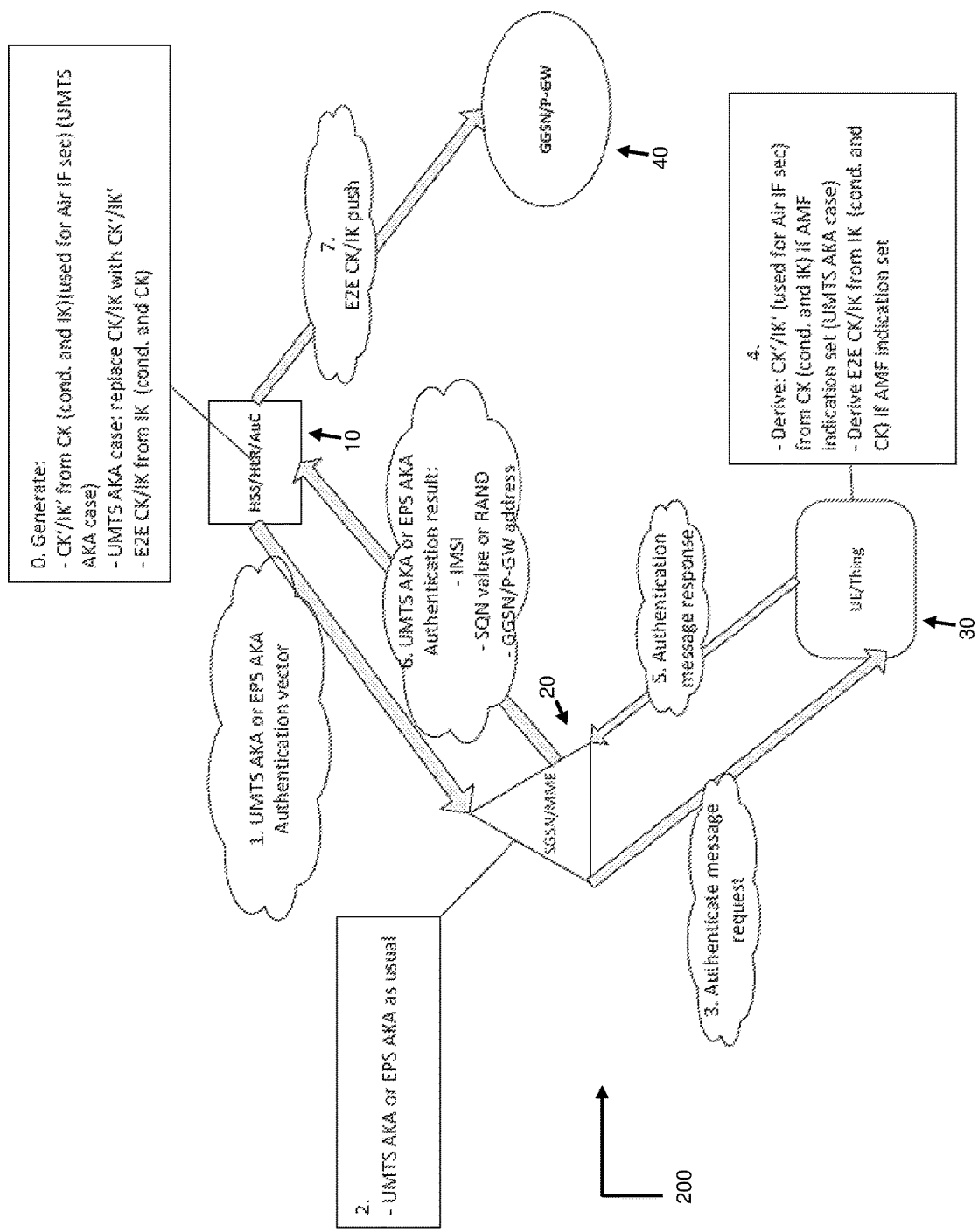
FIG. 2 shows a highly schematic representation of a system using which E2E keys are established at a mobile terminal and a network entity in accordance with a second embodiment.

FIG. 2 shows a highly schematic representation of a system 200 that is similar to that FIG. 1, but is an alternative embodiment of the present disclosure.

In the example embodiment in FIG. 2, Steps 0. to 5. are the same as described above with reference to FIG. 1, except Step 1.*b* is not performed. Instead, in Step 6., after a successful AKA authentication result and/or successful PDP context activation procedure (thereby securing the Air-Interface), the SGSN 20 communicates a notification message to the HSS 10. The notification message comprises at least one of the IMSI of the UE 20 (or any other suitable identifier of the UE 20), the SQN value (or RAND) that were used in the AKA procedure, and an address for the GGSN 40 (which the SGSN 20 may have received from the UE 30).

Using the IMSI and/or the SQN value (or RAND), the HSS 10 can retrieve the E2E CK and E2E IK (and optionally E2E CK Key ID and E2E IK Key ID), and in step 7. communicate the E2E CK and E2E IK (and optionally E2E CK Key ID and E2E IK Key ID) to the GGSN 40. For example, when the E2E keys (and optionally Key IDs) are generated in Step 0, the HSS 10 may store an association between the E2E Keys (and Key IDs) and the IMSI and/or SQN value (or RAND) (for example, in a database that is part of the HSS 10, or is separate from and accessible to the HSS 10) such that the HSS 10 can retrieve the correct E2E Keys (and Key IDs) using the IMSI and/or SQN value (or RAND).

In an alternative, rather than generating the E2E CK and E2E IK (and optionally E2E CK Key ID and E2E IK Key ID) in step 0. and then retrieving them after step 6., the HSS 10 may instead be configured to generate the E2E CK and E2E IK (and optionally E2E CK Key ID and E2E IK Key ID) after step 6. and before step 7. In this alternative, the derivation procedure for E2E CK and E2E IK (and E2E CK Key ID and E2E IK Key ID) may still be the same as that described above with reference to FIG. 1 (for example, the same KDFs may be used).

Figure 3:
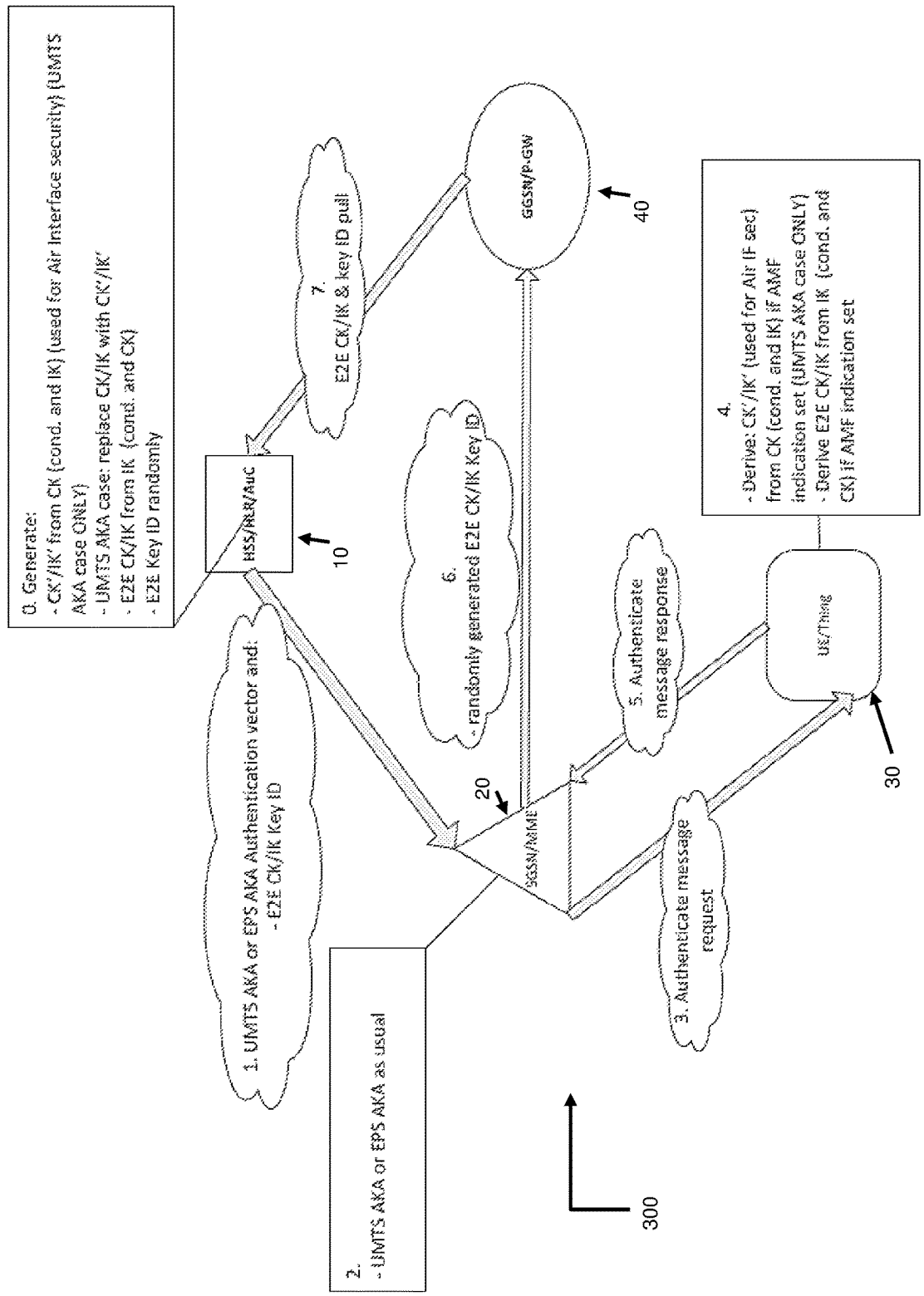
FIG. 3 shows a highly schematic representation of a system using which E2E keys are established at a mobile terminal and a network entity in accordance with a third embodiment.

The embodiment described above with reference to FIG. 2 may alternatively be described as follows:
Procedure:
Preconditions:
The SGSN/MME has indicated the supported security configuration of the GERAN/E-UTRAN to the H-PLMN i.e. the used confidentiality algorithm and integrity protection algorithm (e.g. for GERAN: GEA4 in use, e.g for LTE 128-EEA2 and 128-EIA2 in use)
Steps:
0. In addition to the generated authentication vectors as defined in UMTS AKA (resp. EPS AKA), the AuC:
    derives CK'/IK' from CK (and under specific condition from a concatenation of CK and IK, see clause Y1.2.A) (UMTS AKA case only) and set AMF bit to 1 to indicate to the USIM that KDF is required to be done on CK to obtain the usable CK/IK
    derives E2E CK/IK from IK (and under specific condition from a concatenation of CK and IK, see clause Y1.2.A)
    sets an AMF bit to 1 to indicate to the SGSN/MME/UE whether E2E keys should be derived
    While bluiding the AV and for the UMTS AKA case only, replaces CK/IK with the newly generated CK'/IK'.
1. Distribution of AV to the SGSN/MME
2. UMTS AKA or EPS AKA is carried on at the SGSN/MME level as defined in TS 33.102 (resp. TS 33.401).
3. The SGSN/MME sends the authenticate request message to the UE as defined in TS 33.102 (resp. TS 33.401).
4. The USIM runs UMTS/EPS AKA and performs the following additional key derivations:
    CK'/IK' from CK (and under specific condition from a concatenation of CK and IK, see clause Y1.2.A) (UMTS AKA case ONLY) if the AMF bit which indicate that KDF must be done is set to value 1
    E2E CK/IK from the IK (and under specific condition from a concatenation of CK and IK, see clause Y1.2.A) value if the AMF bit which indicates that E2E KDF must be done is set to value 1
5. The UE sends the authenticate response message to the SGSN/MME as defined in TS 33.102 (resp. TS 33.401).
6. Upon successful UMTS AKA (resp. EPS AKA) authentication result and successful PDP context activation as defined in 23.002 (Resp. PDN Connectivity Request, see 3GPP TS 23.401), the SGSN/MME sends a notification message to the HLR/HSS with the IMSI, the SQN value (or RAND) and the GGSN/P-GW address as parameters.
7. The HLR/HSS pushes the E2E CK/IK to the GGSN/P-GW FIG. 3 shows a highly schematic representation of a system 300 that is similar to that of FIGS. 1 and 2, but is an alternative embodiment of the present disclosure. The embodiments represented in FIGS. 1 and 2 might both be described as HSS push implementations, because E2E CK and E2E IK (and optionally E2E CK Key ID and E2E IK Key ID) are pushed to the GGSN 40 by the HSS 10. In contrast, the embodiment represent in FIG. 3 might be described as a GGSN pull procedure, because the GGSN 40 pulls the E2E CK and E2E IK (and optionally E2E CK Key ID and E2E IK Key ID) from the HSS 10.

Step 0. in the process represented in FIG. 3 is the same as Step 0. described above with reference to FIG. 1.

Step 1. in the process represented in FIG. 3 is the same as Step 1a. described above with reference to FIG. 1, but in addition to communicating the Authentication Vector, the E2E CK Key ID and the E2E IK Key ID are also communicated to the SGSN 20 (for example, along with the Authentication Vector, or as part of the Authentication Vector).

Steps 2. to 5. in the process represented in FIG. 3 are the same as Steps 2. to 5. described above with reference to FIG. 1.

In Step 6., after a successful AKA procedure, the SGSN 20 sends the E2E CK Key ID and the E2E IK Key ID (and optionally also the UE's IMSI, which may in any case be included within a lower layer of a GTP-C header, or any other suitable identifier of the UE) to the GGSN 40. This may be done using any suitable means, for example with a GTP-C message, such as a request for PDP Context activation for GPRS implementations, or a modify bearer command for LTE implementations. The SGSN 20 may have received an address for the GGSN 40 during the earlier steps, or at some other time.

In Step 7., the GGSN 40 fetches, or pulls, the E2E CK and E2E IK from the HSS 10 by providing the E2E CK Key ID and the E2E IK Key ID (and optionally the IMSI) to the HSS 10. The HSS 10 can then return the E2E CK corresponding to the E2E CK Key ID and the E2E IK corresponding to the E2E IK Key ID. For example, when the E2E keys are generated in Step 0., the HSS 10 may store an association between the E2E Keys and their respective Key IDs (for example, in a database that is part of the HSS 10, or is separate from and accessible to the HSS 10) such that the HSS 10 can later retrieve the correct E2E Keys using the Key IDs. The GGSN 40 will then have the E2E CK and E2E IK for use in carrying out communications with the UE 30 in a trusted manner.

In an alternative to this embodiment, rather than the HSS 10 communicating the Key IDs to the SGSN 20 in Step 1., the UE 30 may instead derive the Key IDs using the relevant KDFs in Step 4. and communicate the Key IDs to the SGSN 20 in Step 5.

The embodiment described above with reference to FIG. 3 may alternatively be described as follows:
Procedure:
Preconditions:
The SGSN/MME has indicated the supported security configuration of the GERAN/E-UTRAN to the H-PLMN i.e. the used confidentiality algorithm and integrity protection algorithm (e.g. for GERAN: GEA4 in use, e.g for LTE 128-EEA2 and 128-EIA2 in use)
Steps:
0. In addition to the generated authentication vectors as defined in UMTS AKA (resp. EPS AKA), the AuC:
    derives CK'/IK' from CK (and under specific condition from a concatenation of CK and IK, see clause Y1.2.A) (used for Air IF sec) (UMTS AKA case) and set AMF bit to 1 to indicate to the USIM that KDF is required to be done on CK to obtain the usable CK/IK
    derives E2E CK/IK from IK (and under specific condition from a concatenation of CK and IK, see clause Y1.2.A)
    generates E2E CK/IK key ID randomly
    sets an AMF bit to 1 to indicate to the SGSN/MME/UE whether E2E keys should be derived
    While bluiding the AV and for the UMTS AKA case only, replaces CK/IK with the newly generated CK'/K'.

1. Distribution of AV to the SGSN/MME. In addition, the HLR/HSS/AuC includes:
   the randomly generated E2E CK/IK key ID associated to the AV.
2. UMTS AKA or EPS AKA is carried on at the SGSN/MME level as defined in TS 33.102 (resp. TS 33.401).
3. The SGSN/MME sends the authenticate request message to the UE as defined in TS 33.102 (resp. TS 33.401).
4. The USIM runs UMTS/EPS AKA and performs the following additional key derivations:
   CK'/IK' from CK (and under specific condition from a concatenation of CK and IK, see clause Y1.2.A) (UMTS AKA case ONLY) if the AMF bit which indicate that KDF must be done is set to value 1
   E2E CK/IK from the IK value (and under specific condition from a concatenation of CK and IK, see clause Y1.2.A) if the AMF bit which indicates that E2E KDF must be done is set to value 1
5. The UE sends the authenticate response message to the SGSN/MME as defined in TS 33.102 (resp. TS 33.401).
6a. For GPRS system: Upon successful UMTS AKA procedure, the SGSN sends the randomly generated E2E CK/IK key ID and associated IMSI to the GGSN (e.g. with GTP-C message)
6b. For LTE system: Upon successful EPS AKA procedure, the MME sends the randomly generated E2E CK/IK key ID and associated IMSI to the P-GW (via the S-GW) (e.g. with GTP-C message)
7. The GGSN/P-GW fetches the E2E CK/IK key from the HSS/HLR/AuC By providing the E2E CK/IK key ID and optionally the IMSI FIG. 4 shows a highly schematic representation of a system 400 that is similar to that of FIG. 3, but is an alternative embodiment of the present disclosure, which might also be said to be a GGSN pull implementation.

Figure 4:
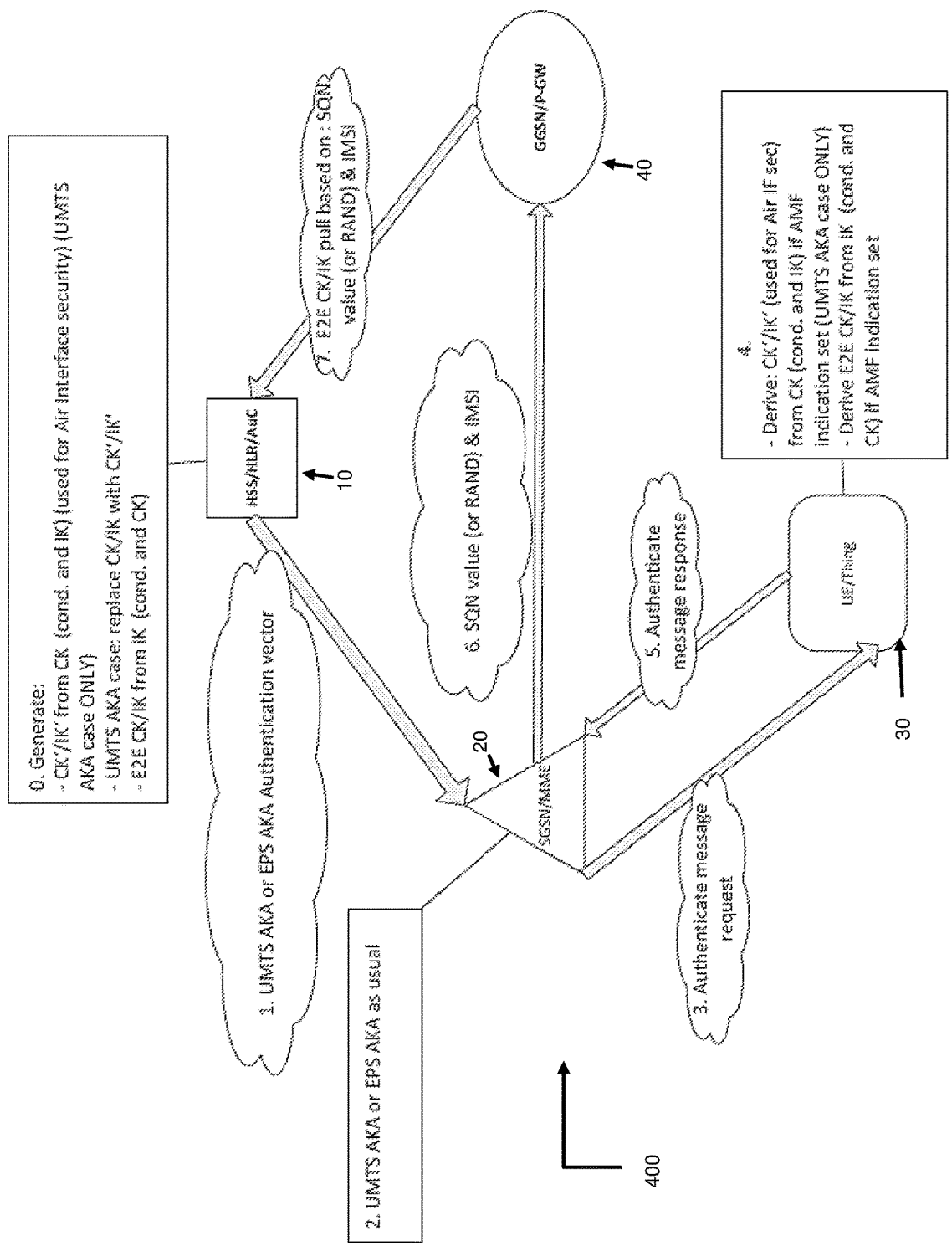
FIG. 4 shows a highly schematic representation of a system using which E2E keys are established at a mobile terminal and a network entity in accordance with a fourth embodiment.

Steps 0. to 5. in the process represented in FIG. 4 are the same as Steps 0. to 5. described above with reference to FIG. 3. However, in contrast to the process described above with reference to FIG. 3, the E2E CK Key ID and the E2E IK Key ID may not be communicated to the SGSN 20 in Step 1.

In Step 6., after a successful AKA procedure, the SGSN 20 sends at least one of the SQN value (or RAND), as defined in the AKA standards, and/or the IMSI of the UE 30 (or any other suitable identifier of the UE 30) to the GGSN 40. This may be done using any suitable means, for example with a GTP-C message, such as a request for PDP Context activation for GPRS implementations or a modify bearer command for LTE implementations. The SGSN 20 may have received an address for the GGSN 40 during the earlier procedure steps, or at some other time.

In step 7., the GGSN 40 fetches, or pulls, the E2E CK and E2E IK (and optionally also the E2E CK Key ID and E2E IK Key ID) from the HSS 10 by providing the SQN (or RAND) and/or the IMSI (or other suitable identifier of the UE 30) to the HSS 10. The HSS 10 can then return the E2E CK and E2E IK (and E2E CK Key ID and E2E IK Key ID) associated with the SQN value (or RAND) and/or IMSI (or other suitable identifier of the UE 30). This step is analogous to Step 7. described earlier with reference to FIG. 3. The GGSN 40 will then have the E2E CK and E2E IK (and E2E CK Key ID and E2E IK Key ID) for use in carrying out communications with the UE 30 in a trusted manner.

Therefore, in all of the embodiments described above, both the GGSN 40 and the UE 30 obtain the E2E CK and E2E IK (and optionally also E2E CK Key ID and E2E IK Key ID). Thus, the E2E keys may be used for communicating user plane data between the UE 30 and the SGSN 40 in a trusted manner. For example, E2E CK may be used to achieve confidentiality protection and/or validation (for example, by encryption/decryption of user-plane data), and E2E IK may be used to achieve integrity protection and/or validation (for example, through generation/verification of a signature and/or MAC).

Because neither E2E CK nor E2E IK will be known to the V-PLMN, the user-plane data may be communicated in a trusted manner, even though the UE 30 communicates with the GGSN 40 via a node (the SGSN 20) of the V-PLMN. Furthermore, because the V-PLMN also does not know CK and IK (because in the UMTS AKA example, rather than using CK and IK, CK' and IK' are used for securing the Air-Interface, and because in EPS AKA, CK and IK are not communicated to the SGSN 20), it would be extremely difficult for the V-PLMN, ever to derive E2E CK and E2E IK. In particular, it would be necessary for the SGSN 20 first to derive or obtain the correct CK and/or IK (which would be very difficult from CK' and IK', since the HSS 10 may derive these from CK and/or IK in an irreversible manner), and then further correctly derive the E2E CK and E2E IK from CK and/or IK.

The embodiment described above with reference to FIG. 4 may alternatively be described as follows:
Procedure:
Preconditions:
The SGSN/MME has indicated the supported security configuration of the GERAN/E-UTRAN to the H-PLMN i.e. the used confidentiality algorithm and integrity protection algorithm (e.g. for GERAN: GEA4 in use, e.g for LTE 128-EEA2 and 128-EIA2 in use)
Steps:
0. In addition to the generated authentication vectors as defined in UMTS AKA (resp. EPS AKA), the AuC:
   derives CK'/IK' from CK (and under specific condition from a concatenation of CK and IK, see clause Y1.2.A) (used for Air IF sec) (UMTS AKA case) and set AMF bit to 1 to indicate to the USIM that KDF is required to be done on CK to obtain the usable CK/IK
   derives E2E CK/IK from IK (and under specific condition from a concatenation of CK and IK, see clause Y1.2.A)
   sets an AMF bit to 1 to indicate to the SGSN/MME/UE whether E2E keys should be derived
   While bluiding the AV and for the UMTS AKA case only, replaces CK/IK with the newly generated CK'/IK'.
1. Distribution of AV to the SGSN/MME
2. UMTS AKA or EPS AKA is carried on at the SGSN/MME level as defined in TS 33.102 (resp. TS 33.401).
3. The SGSN/MME sends the authenticate request message to the UE as defined in TS 33.102 (resp. TS 33.401).
4. the USIM runs UMTS/EPS AKA and performs the following additional key derivation:
   CK'/IK' (used for Air IF sec) from CK (and under specific condition from a concatenation of CK and IK, see clause Y1.2A) (UMTS AKA case ONLY) if the AMF bit which indicate that KDF must be done is set to value 1
   E2E CK/IK from the IK value (and under specific condition from a concatenation of CK and IK, see clause Y1.2.A) if the AMF bit which indicates that E2E KDF must be done is set to value 1

5. The UE sends the authenticate response message to the SGSN/MME as defined in TS 33.102 (resp. TS 33.401).
6a. For GPRS system: Upon successful UMTS AKA procedure, the SGSN sends the SQN value (or RAND) from the AV and associated IMSI to the GGSN (e.g. with GTP-C message such as request PDP Context activation)
6b. For LTE system: Upon successful EPS AKA procedure, the MME sends the SQN value (or RAND) and associated IMSI to the P-GW (e.g. with GTP-C message such as modify bearer command)
7. The GGSN/P-GW fetches the E2E CK/IK key from the HSS/HLR/AuC By providing the SQN value (or RAND) and associated IMSI FIGS. 1 to 4 all represent embodiments whereby special keys, E2E CK and E2E IK, are established at the UE 30 and the GGSN 40 and may be used for carrying out E2E communication of user-plane data between the UE 30 and GGSN 40 in a trusted manner.

Figure 5:
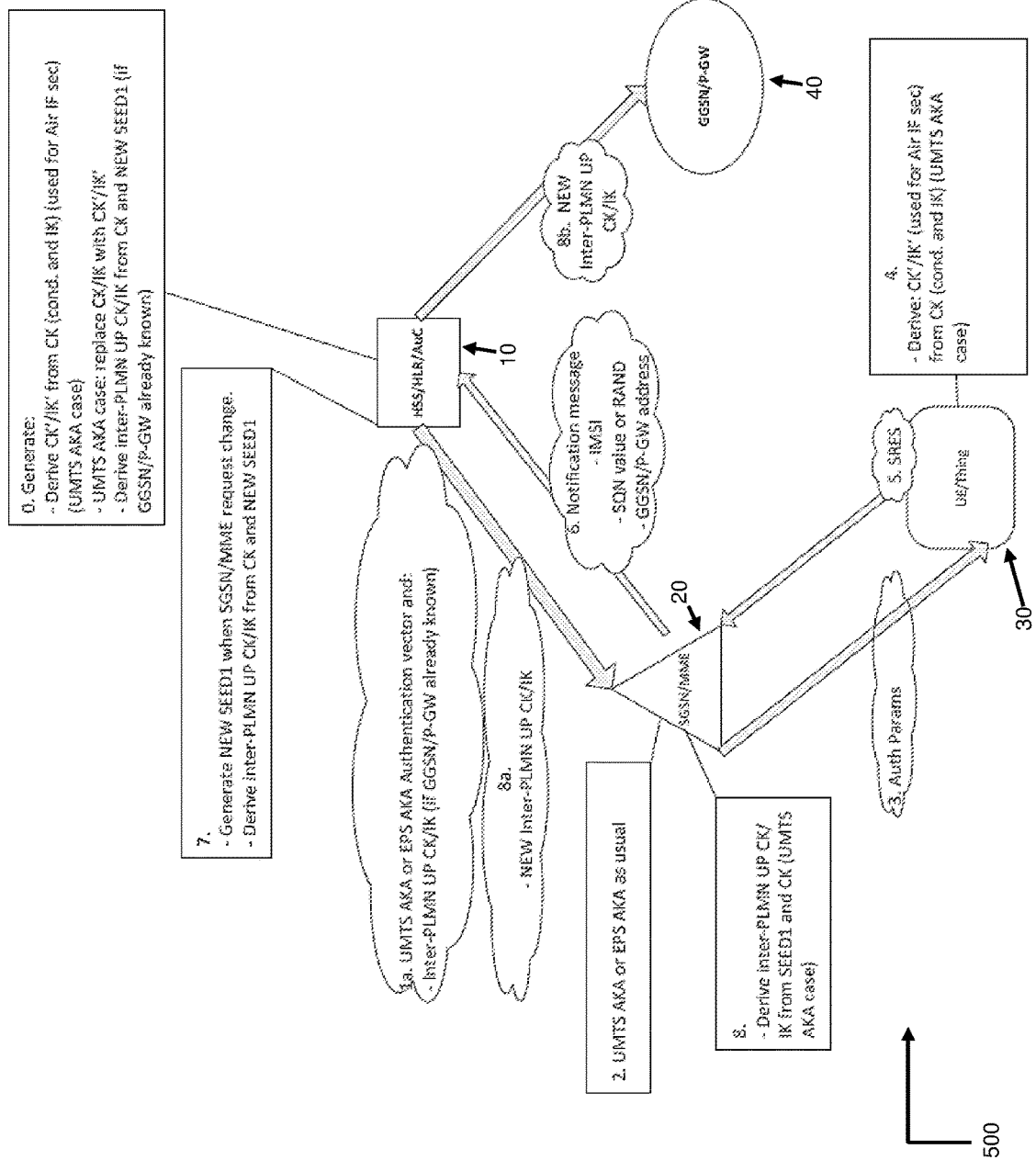
FIG. 5 shows a highly schematic representation of a system using which inter-PLMN keys are established at a node of a cellular network and a network entity in accordance with a fifth embodiment.

FIG. 5 shows a highly schematic representation of a system 500 that represents a further embodiment of the present disclosure. In this embodiment, special keys, Inter-PLMN UP CK and Inter-PLMN UP IK (collectively referred to as the Inter-PLMN keys) are used for Inter-PLMN confidentiality protection and/or validation and/or integrity protection of user-plane data communicated between the UE 30 and GGSN 40.

The process steps of the following described example of this embodiment may be initiated, for example, by the UE 30 joining a V-PLMN for the first time (for example, with a PDN Connectivity Request as part of Session Creation communications—3GPP TS 23.401). Step 0. is similar to Step 0. described above with reference to FIG. 1, but first and second special keys are not derived (in this example, the GGSN 40 is not yet known to the HSS 10).

For UMTS AKA, in step 0. the HSS 10 derives CK' and IK' as described above with reference to FIG. 1. The HSS 10 replaces CK and IK in the Authentication Vector with CK' and IK' and sets the reserved AMF bit to indicate to the UE 30 that key derivation is required in order to obtain CK' and IK' for use in the UMTS AKA procedure.

In Step 1., the HSS 10 communicates the Authentication Vector to the SGSN 20.

Steps 2. to 5. are the same as steps 2. to 5. described above with reference to FIG. 1.

In Step 6., the SGSN 20 communicates a notification message to the HSS 10. The notification may be sent upon successful PDP context activation (as defined in 3GPP TS 29.060). The notification may comprise at least one of: the UE's IMSI (or any other suitable identifier of the UE 30); the SQN value (or RAND) (as defined in the AKA standards); and an address for the GGSN 40 (for example, the IP address of the GGSN 40, or any other suitable address type). The SGSN 20 may have obtained the address for the GGSN 40 from the UE 30 during an earlier step, or at any other time.

In Step 7, having received the notification message, the HSS 10 derives a first special key (inter-PLMN UP CK). Inter-PLMN UP CK may be used by the SGSN 20 and the GGSN 40 for confidentiality protection and/or validation of user-plane data communicated between the UE 30 and the GGSN 40 (as explained in more detail later). Inter-PLMN UP CK is derived to be different from CK and IK. Inter-PLMN UP CK may be derived from CK and SEED1 (which may, for example, be a random value or a counter). Inter-PLMN UP CK may be derived in any suitable way, for example using HMAC SHA 256, or any other suitable algorithm/function. Optionally, the HSS 10 may also generate a Key ID for Inter-PLMN UP CK, for example by generating a random or pseudo random number, or by using a KDF (in an analogous way to that described above in respect of the E2E Key IDs).

The HSS 10 also derives a second special key (inter-PLMN UP IK). Inter-PLMN UP IK may be used by the SGSN 20 and the GGSN 40 for integrity protection and/or validation of user-plane data communicated between the UE 30 and GGSN 40 (as explained in more detail later). Inter-PLMN UP IK is derived to be different from CK and IK. Inter-PLMN UP IK may be derived from CK and SEED1. Inter-PLMN UP IK may be derived in any suitable way, for example using HMAC SHA 256, or any other suitable algorithm/function. Optionally, the HSS 10 may also generate a Key ID for Inter-PLMN UP IK, or by using a KDF (in an analogous way to that described above in respect of the E2E Key IDs).

In one example key generation procedure, if CK is 128 bits long, Inter-PLMN UP CK and Inter-PLMN UP IK may be derived by:

Inter-PLMN UP CK=KDF(CKHSEED1∥SGSN ID∥GGSN ID∥key type)

Inter-PLMN UP IK=KDF(CKHSEED1∥SGSN ID∥GGSN ID∥key type)

In a further example key generation procedure, if CK is 256 bits long, Inter-PLMN UP CK and Inter-PLMN UP IK may be derived by:

Inter-PLMN UP CK=KDF(CK,SEED1∥SGSN ID∥GSN ID∥key type)

Inter-PLMN UP IK=KDF(CK,SEED1∥SGSN ID∥GGSN ID∥key type)

In these examples, SEED1 may be a counter or random value, GGSN ID may be any suitable identifier of the GGSN 40, for example the IP address of the GGSN 20, and SGSN ID may be any suitable identifier of the SGSN 20, for example the IP address of the SGSN 20.

In these examples, the key derivation function is written as KDF (Key, S). 'key type', or S, may be a constant/static value, as described earlier in respect of the E2E keys. The algorithm used for the key derivation function may be HMAC SHA 256 (as defined in 3GPP TS 33.220), although it will be appreciated that any other key derivation function may alternatively be used. Inter-PLMN UP CK and Inter-PLMN UP IK may be derived in such a way that it is very difficult, or impossible, to determine CK and/or IK from Inter-PLMN UP CK and/or Inter-PLMN UP IK.

The above key generation procedures for generating Inter-PLMN UP CK and Inter-PLMN UP IK are described by way of example only. Other suitable key generation procedures may alternatively be used.

In Step 8a., the HSS 10 communicates the inter-PLMN UP CK and the inter-PLMN UP IK (and optionally the inter-PLMN UP CK Key ID and the inter-PLMN UP IK Key ID) to the SGSN 20 (in the LTE and S4-SGSN cases, these data may then be provided by the SGSN 20 to the S-GW).

In Step 8b., the HSS 10 pushes inter-PLMN UP CK and inter-PLMN UP IK (and optionally the inter-PLMN UP CK Key ID and inter-PLMN UP IK Key ID) to the GGSN 40. The inter-PLMN UP CK and inter-PLMN UP IK may be concatenated (inter-PLMN UP CK∥inter-PLMN UP IK) for communication to the GGSN 40, such that Inter-PLMN UP CK goes from bit 0 to bit 127 and Inter-PLMN UP IK goes from bit 128 to bit 255 (or alternatively, Inter-PLMN UP IK goes from bit 0 to bit 127 and Inter-PLMN UP CK goes from bit 128 to bit 255). Likewise, inter-PLMN UP CK Key ID and inter-PLMN UP IK Key ID may be concatenated (inter-PLMN UP CK Key ID||inter-PLMN UP IK Key ID) for communication to the GGSN 40, such that Inter-PLMN UP CK Key ID goes from bit 0 to bit 127 and Inter-PLMN UP IK Key ID goes from bit 128 to bit 255 (or alternatively, Inter-PLMN UP IK Key ID goes from bit 0 to bit 127 and Inter-PLMN UP CK Key ID goes from bit 128 to bit 255) Step 8b. is therefore analogous to step 1b. described above with reference to FIG. 1.

The SGSN 20 and the GGSN 40 now both have inter-PLMN UP CK and inter-PLMN UP IK (and optionally inter-PLMN UP CK Key ID and inter-PLMN UP IK Key ID), using which communication of user-plane data between the two fixed inter-network elements (for example, via the SGSN-GGSN interface, or the SGW-PGW interface) may be carried out in a trusted manner, such that the SGSN 20 may ensure confidentiality and/or integrity of user-plane data on behalf of the UE 30. In particular, the inter-PLMN keys can be used so that the visited network can provide user plane data origin authenticity and/or confidentiality on behalf of the UE 20 (for example, using generation/verification of a signature/MAC and/or encryption/decryption of user plane data, analogously to the E2E keys described above), so that the H-PLMN may achieve a higher level of trust toward the visited network as the endpoint entity. This may be achieved by using the Inter-PLMN keys to protect user plane data (the lowest level being the N-PDU packets), for example by encryption/decryption and/or use of a signature/MAC.

Additionally or alternatively, it is possible to protect lower layer messages, such as the GTP header, for example by encryption/decryption. This may be used to provide subscriber identity privacy protection.

Thus, communicating in a trusted manner can even be achieved even where the communications link between the H-PLMN and the visited network carries GTP packets and is not trusted. Furthermore, communication of user-plane data between the UE 30 and the SGSN 20 may be carried out in a trusted manner by virtue of the successful AKA procedure. Consequently, communication of user-plane data between the UE 30 and GGSN 40 can be carried out in a trusted manner using the special keys inter-PLMN UP CK and inter-PLMN UP IK.

In an alternative, rather than the HSS 10 pushing inter-PLMN UP CK and inter-PLMN UP IK (and optionally the inter-PLMN UP CK Key ID and inter-PLMN UP IK Key ID) to the GGSN 40, a GGSN pull procedure may be employed. In this alternative, after Step 5., the SGSN 20 may communicate to the GGSN 40 at least one of: the IMSI of the UE (or any other suitable identifier of the UE 30); the inter-PLMN UP CK Key ID and inter-PLMN UP IK Key ID; and/or the SQN value (or RAND). This is analogous to Step 6. described above with reference to FIGS. 3 and 4. The GGSN 40 may then use at least one of these to pull the inter-PLMN UP CK and inter-PLMN UP IK (and optionally the inter-PLMN UP CK Key ID and inter-PLMN UP IK Key ID) from the HSS 10. Thus, it can be seen that the GGSN pull procedure for obtaining inter-PLMN UP CK and inter-PLMN UP IK is analogous to the GGSN pull procedures described above with reference to FIGS. 3 and 4.

In an alternative, when the above described process steps are initiated, the GGSN 40 may be known to the HSS 10. For example, the UE 30 may be joining the V-PLMN for the first time with a PDN connectivity request (defined in 3GPP TS 23.401), comprising at least an address for the GGSN 40. Alternatively, the SGSN 20 may be requesting a new Authentication Vector for a UE 30 that has already been registered on the V-PLMN. In this instance, because the HSS 10 knows the address for the GGSN 40, in addition to the processes of Step 0. described above, the HSS 10 can also generate the Inter-PLMN UP CK and Inter-PLMN UP IK (and optionally also the Inter-PLMN UP CK Key ID and Inter-PLMN UP IK Key ID).

The HSS 10 may then communicate the Inter-PLMN UP CK and Inter-PLMN UP IK (and optionally also the Inter-PLMN UP CK Key ID and Inter-PLMN UP IK Key ID) to the SGSN 20 with the Authentication Vector in step 1., 7., and 8a. would then not be necessary. Furthermore, Step 6., would be optional as the HSS 10 may communicate the inter-PLMN UP CK and inter-PLMN UP IK (and optionally also inter-PLMN UP CK Key ID and inter-PLMN UP IK Key ID) to the GGSN 40 at any suitable time according to the HSS push or GGSN pull procedures described above.

In a further alternative, the above described process may be initiated when there has been a change in SGSN. In this instance, the HSS 10 may receive a LAU/RAU/TAU notification indicating that there has been an SGSN 20 change (or a S-GW change in the case of S4 interface usage by the SGSN 20), or a notification of successful Update PDP context message exchange (as defined in 3GPP TS 29.060) indicating that there has been a change of SGSN, and optionally also a change in GGSN. In this instance, the previous inter-PLMN keys should not be communicated to the new SGSN 20 as they represent a unique association between a specific SGSN and GGSN. If the new SGSN is part of the same PLMN as the previous SGSN, in step 0. the HSS 10 may simply generate a new SEED1 value and use it, along with the new SGSN address (and the new GGSN address, where relevant), to generate a new inter-PLMN UP CK and a new inter-PLMN UP IK (and optionally also new inter-PLMN UP CK Key ID and a new inter-PLMN UP IK Key ID). These data may then be communicated to the new SGSN (without also communicating an Authentication Vector) and to the GGSN 40 (or new GGSN, where relevant). None of the other Steps described above subsequently would need to be undertaken as the new SGSN and the GGSN 40 (or new GGSN, where relevant) would both have new inter-PLMN keys (and new inter-PLMN Key IDs). However, if the new SGSN is not part of the same PLMN as the previous SGSN (i.e., it belongs to a different PLMN), the HSS 10 should not directly generate a new inter-PLMN UP CK and a new inter-PLMN UP IK. Instead, a new AKA procedure should be run and new inter-PLMN keys established by carrying out Steps 0. to 8b. described above. In this way, inter-PLMN security may be maintained during inter-SGSN mobility.

The example embodiment described above with reference to FIG. 5 may alternatively be described as follows:

Procedure:

Preconditions:

The SGSN/MME has indicated the supported security configuration of the GERAN/E-UTRAN to the H-PLMN i.e. the used confidentiality algorithm and integrity protection algorithm (e.g. for GERAN: GEA4 in use, e.g for LTE 128-EEA2 and 128-EIA2 in use)

Steps:

0. In addition to the generated authentication vectors as defined in UMTS AKA (resp. EPS AKA), the AuC:
   derives CK'/IK' from CK (and under specific condition from a concatenation of CK and IK, see clause Y1.2.A) (used for Air IF sec) (UMTS AKA case) and set AMF bit to 1 to indicate to the USIM that KDF is required to be done on CK to obtain the usable CK/IK Generate a random number SEED1 derives inter-PLMN UP CK/IK from CK and SEED1 if and only if the HLR/HSS already knows the current GGSN/P-GW ID (See clause Y1.2.A to understand the key derivation function)

sets an AMF bit to 1 to indicate to the UE whether CK'/IK' should be derived

While building the AV and for the UMTS AKA case only, replaces CK/IK with the newly generated CK'/IK'.

1. Distribution of AV to the SGSN/MME. In addition, the HLR/HSS/AuC may include:

Inter-PLMN UP CK/IK if it already generated.

2. UMTS AKA or EPS AKA is carried on at the SGSN/MME level as defined in TS 33.102 (resp. TS 33.401).

3. The SGSN/MME sends the authenticate request message to the UE as defined in TS 33.102 (resp. TS 33.401).

4. the USIM runs UMTS/EPS AKA and performs the following additional key derivation:

CK'/IK' (used for Air IF sec) from CK (and under specific condition from a concatenation of CK and IK, see clause Y1.2A) (UMTS AKA case ONLY) if the AMF bit which indicate that KDF must be done is set to 1

5. The UE sends the authenticate response message to the SGSN/MME as defined in TS 33.102 (resp. 3GPP TS 33.401).

6. The SGSN/MME should send a notification message to the HLR/HSS with the IMSI, the SQN value (or RAND) and the GGSN/P-GW address:

Upon successful PDP context activation as defined in 3GPP TS 29.060 (Resp. PDN Connectivity Request, see 3GPP TS 23.401) if it wasn't provided with an Inter-PLMN UP CK/IK during step 1.

Upon successful Update PDP context message exchange as defined in 3GPP TS 29.060.

7. The HSS/HLR should derive an Inter-PLMN UP CK/IK from CK and SEED1 value:

Upon notification from step 6.

Otherwise upon LAU/RAU/TAU notification, which means a SGSN/MME change (or S-GW change in case of S4 interface usage by the SGSN) has happened. A new random value SEED1 should be generated before deriving the Inter-PLMN UP CK/IK.

NOTE: If the new SGSN/MME belongs to another serving network, then the HLR/HSS should not return a new Inter-PLMN UP CK/IK value. A new UMTS AKA (resp EPS AKA) should instead be run.

8a. The HSS/AuC sends the Inter-PLMN User Plane CK/IK and a generated key ID to the SGSN/MME/S-GW.

8b. The HSS/HLR/AuC pushes to the GGSN/P-GW the following:

the new Inter-PLMN UP CK/IK and a generated key ID

Inter-SGSN Mobility Impact for Inter-PLMN Security:

When the SGSN is changed, the current inter-PLMN UP keys mustn't be transmitted to the new SGSN as they represent a unique association between a specific SGSN and GGSN.

Note: It is FFS (For Further Study) which address needs to be used for GERAN: the GGSN address for User Traffic may be the right address candidate. For the record: if there is inter-SGSN mobility, after the forward relocation request/response, the new SGSN will send an Update PDP context request. The GGSN may also transmit a new GGSN address in the Update PDP context response. See clause 7.7.29 in 3GPP TS 29.060

The key derivation procedures described earlier in respect of both the E2E Keys and the Inter-PLMN keys may alternatively be described as follows:

Y1.2.A Key Derivation Rules

The following is one possible way of implementing the key derivation rules. Other possible implementations options may be defined.

The key derivation function should be supported by the UICC and the HLR/HSS/AuC and is written as KDF (Key, S) below.

The key derivation algorithm should be HMAC SHA 256 (as defined in 3GPP TS 33.220).

For the UMTS AKA case, the following key derivation applies if Tuak is used with initial CK length of 256 bits:

CK'||IK'=KDF (CK, key type). The key derivation algorithm should be in this case HMAC SHA 256 (as defined in 3GPP TS 33.220).

NOTE: CK' goes from bit 0 to bit 127, IK' goes from bit 128 to bit 255

For the UMTS AKA case, the following key derivation applies if Milenage or Tuak is used with initial CK and IK length of 128 bits:

CK'||IK'=KDF (CK||IK, key type).

NOTE: CK' goes from bit 0 to bit 127, IK' goes from bit 128 to bit 255

If CK/IK is 128 bit long, the following key generation procedures apply:

Inter-PLMN UP CK/IK=KDF (CK||SEED1||SGSN ID||GGSN ID||key type)

E2E CK/IK=KDF (CK||IK, key type)

E2E CK/IK Key ID=KDF (CK||IK, key type)

NOTE: E2E CK (resp. E2E CK Key, E2E CK Key ID, Inter-PLMN UP CK) goes from bit 0 to bit 127, E2E IK (resp. E2E IK Key, E2E IK Key ID, Inter-PLMN UP IK) goes from bit 128 to bit 255

If CK and IK is 256 bit long, the following key generation procedures apply:

inter-PLMN UP CK=KDF (CK, SEED1||SGSN ID||GGSN ID||key type)

inter-PLMN UP IK=KDF (CK, SEED1||SGSN ID||GGSN ID||key type)

E2E CK=KDF (IK, key type)

E2E IK=KDF (IK, key type)

E2E Key ID=KDF (IK, key type)

SEED1: Counter or random value

GGSN/P-GW ID: IP address

SGSN ID: FFS (For Further Study)

As can be appreciated, all of the above embodiments utilise and are compatible with AKA procedures, such as UMTS AKA and EPS AKA. By carrying out the above described procedures, User-plane data may be communicated between the UE 30 and the GGSN 40 in a trusted manner without requiring the use of TLS and GBA (for example by using the E2E Keys or Inter-PLMN Keys to: generate/verify a signature and/or MAC; and/or cipher/decipher the user plane data). Thus, the processes of the present disclosure achieve significant improvements in efficiency compared with TLS and GBA, particularly where the cellular network provides a very low throughput connection to the UE 30. Not only does this make the process of establishing trusted communications quicker, it also reduces the energy consumption (which can improve the battery life) of the UE 130.

Furthermore, the above embodiments remain compatible with existing security procedures between the UE and the E-UTRAN defined in 3GPP TS 33.401. They also remain compatible with existing security procedures between the UE and the GERAN when UMTS AKA is used as defined in 3GPP TS 33.102.

Furthermore, different security policies may be set on a per device and/or traffic type basis, for example confidentiality protection only (such as encryption/decryption), or validation/integrity protection only (such as signatures and/or MACs), or both. The inter-PLMN embodiment described with reference to FIG. 5 also removes the need to agree VPN keys between different networks and enables origin authentication to be achieved.

Furthermore, an authentication and key usage policy can be driven by the HSS 10. The V-PLMN typically has little or no information about the UE 30 because the UE 30 will mostly deal with the H-PLMN, so an authentication policy not properly defined at the V-PLMN side may harm the battery life of the UE 30. The H-PLMN will be better informed of the best authentication policy to use, so an HSS 10 driven authentication policy may enable the H-PLMN to achieve efficiencies and/or improvements in the system, for example the above described improvements in the battery lifetime of the UE 30.

In particular, if the SGSN 20 requests multiple sets of authentication data (for example, by running multiple AKA procedures), the SGSN 20 may be obliged preferentially to use authentication data (for example, an Authentication Vector) that has the reserved AMF bit set as described above, thereby preferentially using the more efficient processes described above. Furthermore, the HSS 20 may be configured to return to the SGSN 20 only one Authentication Vector (or fewer Authentication Vectors than requested), regardless of the number of Authentication Vectors requested by the SGSN 20 for each SGSN 20 Authentication Request. An expiration time may be indicated for each Authentication Vector that it communicates to the SGSN 20. When an Authentication Vector expires, the SGSN 20 may be configured to use a stored, unused and not expired Authentication Vector (prioritising the use of Authentication Vectors with the reserved AMF bit set as described above, or request a new Authentication Vector from the HSS 20. In this way, the H-PLMN may maintain more long term control of authentication and key usage policies by requiring the V-PLMN to obtain new Authentication Vectors on a regular, or semi-regular, basis.

The authentication and key usage policies may alternatively be described as follows:

The H-PLMN is better informed of the best authentication policy which will maximize the battery capacity of the UE. The V-PLMN doesn't have sufficient information about the MTC customer (which mainly deals with the H-PLMN). An HLR/HSS-driven authentication policy is therefore needed.

An AMF bit is reserved to indicate whether E2E keys have to be derived by the USIM. If the SGSN/MME has requested a number of authentication data from the HSS, the SGSN/MME should first use the one that have the AMF bit requesting E2E keys being derived. The HLR/HSS should only return one AV with AMF bit set to request E2E key derivation per SGSN/MME AV request.

The HLR/HSS should also provide an expiration time to the authentication vectors. When the expiration time is reached, the SGSN/MME should either use the stored, unused and not expired AV or request new AV to the HLR/HSS.

When the HLR/HSS is requested with more than one of AV, it may return a different number of Avs to the SGSN/MME (always inferior to the requested amount).

Various aspects and embodiments of the disclosure are described above. It will be appreciated that these aspects and embodiments are described by way of specific example only and that a number of variations or modifications may be employed.

For example, in the embodiments described with reference to FIGS. 1 to 4, both E2E CK and E2E IK are derived by the HSS 10 and the UE 30 and communicated to the GGSN 40. However, only one of E2E CK and E2E IK may be derived by the HSS 10 and/or UE 30. Alternatively, both E2E CK and E2E IK may be derived by the HSS 10 (and one or both derived by the UE 30), but only one communicated to the GGSN 40. In this alternative, if the UE 30 and the GGSN 40 both have E2E CK (but not E2E IK), user-plane data may be communicated in a trusted manner by using E2E CK for confidentiality protection and/or validation. If the UE 30 and the GGSN 40 both have E2E IK (but not E2E CK), user-plane data may be communicated in a trusted manner by using E2E IK for integrity protection and/or validation.

Even if both the UE 30 and the GGSN 40 have the E2E CK and E2E IK, it may be that only one is used for communicating user-plane data between the two.

Likewise, in the embodiments described with reference to FIG. 5, both Inter-PLMN UP CK and Inter-PLMN UP IK are derived by the HSS 10 and the SGSN 20 and communicated to the SGSN 20 and the GGSN 40. However, only one of PLMN UP CK and Inter-PLMN UP IK may be derived by the HSS 10 and provided to the SGSN 20 and GGSN 40. Alternatively, both PLMN UP CK and Inter-PLMN UP IK may be derived by the HSS 10, but only one communicated to the SGSN 20 and GGSN 40. In this alternative, if the SGSN 20 and the GGSN 40 both have Inter-PLMN UP CK (but not Inter-PLMN UP IK), user-plane data may be communicated in a trusted manner by using Inter-PLMN UP CK for confidentiality protection and/or validation. If the SGSN 20 and the GGSN 40 both have Inter-PLMN UP IK (but not Inter-PLMN UP CK), user-plane data may be communicated in a trusted manner by using Inter-PLMN UP IK for integrity protection and/or validation.

Even if both the SGSN 20 and the GGSN 40 have the Inter-PLMN UP CK and Inter-PLMN UP IK, it may be that only one is used for communicating user-plane data between the two.

In a further alternative, E2E CK and E2E IK may be the same, such that a single key may effectively be used to carry out the functions of both E2E CK and E2E IK. Likewise, Inter-PLMN UP CK and Inter-PLMN UP IK may be the same, such that a single key may effectively be used to carry out the functions of both Inter-PLMN UP CK and Inter-PLMN UP IK.

Thus, it can be seen that different security policies may be set on a per device and/or traffic type basis, for example confidentiality protection only (such as encryption/decryption), or validation/integrity protection only (such as signatures and/or MACs), or both.

Furthermore, where Key IDs are generated as part of the embodiments described with reference to FIGS. 1 to 4, rather than using a KDF as described above, the Key IDs may be generated in any other way. For example, they may be random, or pseudo random, numbers. In this case, the Key IDs may be communicated from the HSS 10 to the SGSN 20 along with, or as part of, the Authentication Vector, and the SGSN 20 may in turn forward them to the UE 30, for example in step 3.

In the above described embodiments, E2E CK and E2E IK (and E2E CK Key ID and E2E IK Key ID) are described as being derived from IK, or CK and IK. In an alternative, they may be derived from CK. Likewise, whilst Inter-PLMN UP CK and Inter-PLMN UP IK are described as being derived from CK, they may alternatively be derived from IK, or CK and IK. Likewise, whilst CK' and IK' are described as being derived from CK, or CK and IK, they may alternatively be derived from IK.

In some of the disclosed embodiments, Key IDs for E2E CK and E2E IK, or Inter-PLMN UP CK and Inter-PLMN UP IK, are used as part of the described process (for example, in the GGSN pull implementation described in respect of FIG. 3). It will be appreciated that even when the Key IDs are not used as part of the above described processes, they may nevertheless be generated by the HSS 10 and/or UE 30 and optionally communicated to the SGSN 20 and/or GGSN 40 (for example, so that they can be used for key tracking etc).

In the above disclosed embodiments, for UMTS-AKA procedures, CK' and IK' are inserted into the Authentication Vector and used for the AKA procedure instead of CK and IK. However, it will be appreciated that in an alternative, CK and IK may be used in the Authentication Vector and the usual UMTS-AKA procedure defined in the standards may be followed.

In the above described embodiments, the Authentication Vector has a reserved AMF bit for indicating to the UE 30 that key derivation is required (to obtain the E2E keys and/or CK' and IK'). It will be appreciated that this may be indicated to the UE 30 in any other suitable way, for example by modifying the Authentication Vector in a different way, or by a different means within the communication steps described above (for example, by including additional data in communication steps 1./1a for forwarding to the UE 20 in step 3., etc), or with a further communication step(s).

In the Figures, direct communication between the HSS 10, the SGSN 20, the UE 30 and the GGSN 40 is shown. However, it will be appreciated that communications may pass through any number of intermediate entities, for example network routing servers etc. Furthermore, whilst the HSS 10, SGSN 20 and the GGSN 40 have been represented in the Figures as single elements, it will be appreciated that any one or more of them may be implemented as two or more entities, for example in a cluster arrangement of server instances, wherein each entity may be located in the same geographic location or different geographic locations. Furthermore, one or more of the HSS 10, SGSN 20 and the GGSN 40 may be implemented as part of a multipurpose entity, for example as a software or functional element within a server, or as programmable logic, firmware or a configurable system.

Furthermore, whilst the above description relates to protecting user-plane data communicated between the UE 30 and the GGSN 40, it will be appreciated that user-plane data may be communicated in a trusted manner between the UE 30 and any network entity using the disclosed processes. Furthermore, the security functionalities supported by the GGSN 40 (or any other home-network entity communicating with the UE 20) may be generalised as a logical node (or network entity). The logical node (or network entity) may be collocated with the GGSN 40 or supported by the GGSN 40.

The invention claimed is:

1. A method for secure communication between a mobile terminal and a network entity via a node of a cellular network, said method comprising:
   applying a special key to allow communication of user-plane data between the mobile terminal and the network entity in a trusted manner, wherein the special key is generated from both a ciphering key (CK) and an integrity key (IK) but is different from the CK and the IK, and wherein generating the special key from both the CK and the IK is performed by first concatenating the CK with the IK to form concatenated data and then subsequently deriving the special key based on the concatenated data,
   wherein a Home Public Land Mobile Network (H-PLMN) of the mobile terminal generates the CK or the IK for authentication of the mobile terminal,
   wherein the node is in a Visited PLMN (V-PLMN),
   wherein performance of an Authentication and Key Agreement (AKA) procedure between the mobile terminal and the node of the cellular network permits the mobile terminal to determine the CK or the IK, and
   wherein the network entity is in the H-PLMN or is coupled to the H-PLMN.

2. The method of claim 1, wherein the special key is a first special key, wherein applying the first special key allows confidentiality protection or validation of the user-plane data, and wherein the method further comprises:
   applying a second special key to allow integrity protection or validation of user-plane data communicated between the mobile terminal and the network entity, wherein the second special key is generated from the CK or IK but is different from the CK and the IK.

3. The method of claim 1, further comprising:
   generating one or more alternate keys from the CK or IK, in such a way that the CK and IK cannot be derived from the one or more alternate keys, the one or more alternate keys being different from the special key; and
   using the one or more alternate keys as part of the AKA procedure between the mobile terminal and the cellular network.

4. The method of claim 3, further comprising:
   communicating an authentication vector comprising the one or more alternate keys from a home registration entity in the H-PLMN to a visitor registration entity in the V-PLMN.

5. The method of claim 1, further comprising:
   communicating an authentication management field flag between the cellular network and the mobile terminal, the authentication management field flag indicating use of the special key or use of one or more alternate keys.

6. The method of claim 1, wherein the special key is generated at the mobile terminal, and wherein applying the special key comprises security protecting or validating the user-plane data at the mobile terminal using the special key.

7. The method of claim 1, wherein the special key is generated at a home registration entity in the H-PLMN, and wherein applying the special key comprises communicating the special key from the home registration entity to the network entity.

8. The method of claim 7, wherein the special key is generated at the home registration entity in the H-PLMN, and wherein communicating the special key from the home registration entity to the network entity is performed in response to generating the special key.

9. The method of claim 7, further comprising:
   receiving an AKA authentication result message at the home registration entity from a visitor registration entity in the V-PLMN, wherein communicating the special key from the home registration entity to the network entity is performed in response to receiving the AKA authentication result message.

10. The method of claim 9, wherein the AKA authentication result message identifies a routing address for the network entity, and wherein the special key is communicated using the identified routing address.

11. The method of claim 7, further comprising:
communicating a pull message from the network entity to the home registration entity, the pull message providing indication data for identifying the mobile terminal, wherein communicating the special key from the home registration entity to the network entity is performed in response to receiving the pull message.

12. The method of claim 11, wherein the indication data for identifying the mobile terminal comprises one or more of: (i) a key identifier associated with the mobile terminal, (ii) an authentication data item, derived from an authentication vector for the mobile terminal communicated from the home registration entity to a visitor registration entity in the V-PLMN, (iii) an International Mobile Subscriber Identity (IMSI) for the mobile terminal, or (iv) a Mobile Subscriber ISDN for the mobile terminal.

13. The method of claim 11, further comprising:
communicating the indication data for identifying the mobile terminal from a visitor registration entity in the V-PLMN to the network entity, prior to communicating the pull message from the network entity to the home registration entity.

14. The method of claim 1, wherein the special key is generated at a home registration entity in the H-PLMN, and wherein applying the special key comprises:
communicating the special key from the home registration entity to a visitor registration entity in the V-PLMN; and
using the special key at the visitor registration entity to communicate the user-plane data in the trusted manner.

15. The method of claim 1, wherein the special key is further generated from a random number seed, the random number seed being generated for the special key only.

16. A computer program product, comprising one or more computer-readable storage media having stored thereon computer-readable instructions that are structured such that when executed by a processor, cause a computing system to operate in accordance with the method of claim 1.

17. A network entity configured for secure communication with a mobile terminal via a node of a cellular network, the network entity comprising:
one or more processors; and
one or more computer-readable media having thereon computer-executable instructions that are structured such that, when executed by the one or more processors, cause the network entity to:
apply a special key to allow communication of user-plane data between the mobile terminal and the network entity in a trusted manner, wherein the special key is generated from both a ciphering key (CK) and an integrity key (IK) but is different from the CK and IK, and wherein generating the special key from both the CK and the IK is performed by first concatenating the CK with the IK to form concatenated data and then subsequently deriving the special key based on the concatenated data,
wherein a Home Public Land Mobile Network (H-PLMN) of the mobile terminal generates the CK or the IK for authentication of the mobile terminal,
wherein the network entity is in the H-PLMN or is coupled to the H-PLMN and the node is in a Visited PLMN (V-PLMN), and
wherein performance of an Authentication and Key Agreement (AKA) procedure between the mobile terminal and the node of the cellular network permits the mobile terminal to determine the CK or the IK.

* * * * *